(12) United States Patent
Huang et al.

(10) Patent No.: US 7,756,633 B2
(45) Date of Patent: Jul. 13, 2010

(54) SYSTEM AND METHOD FOR SECURITY ENHANCED RIDESHARE

(75) Inventors: Qingfeng Huang, San Jose, CA (US);
David K. Fork, Los Altos, CA (US);
Luke Plurkowski, Antioch, CA (US);
Dave Weinerth, Oakland, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 693 days.

(21) Appl. No.: 11/801,874

(22) Filed: May 11, 2007

(65) Prior Publication Data

US 2008/0277183 A1    Nov. 13, 2008

(51) Int. Cl.
*G01C 21/00*    (2006.01)
(52) U.S. Cl. ...................................... 701/207
(58) Field of Classification Search .................. 701/207
See application file for complete search history.

(56) References Cited

U.S. PATENT DOCUMENTS 4,360,875 A * 11/1982 Behnke ................... 455/456.5

5,504,482 A * 4/1996 Schreder ................. 340/995.13

(Continued)

FOREIGN PATENT DOCUMENTS

JP    2003256982 A    9/2003
JP    2003331013 A    11/2003

OTHER PUBLICATIONS

Edward W. Walbridge, "Real Time Ridesharing Using Wireless Pocket Phones To Access The Ride Matching Computer," IEEE publications, pp. 486-492 (1995).

(Continued)

*Primary Examiner*—Thomas G Black
*Assistant Examiner*—Shelley Chen
(74) *Attorney, Agent, or Firm*—Patrick J. S. Inouye; Krista A. Wittman

(57) ABSTRACT

A method and system for a comprehensive security-enhanced rideshare system is provided. The rideshare program includes localization, mapping and ride matching for participants. Participation incentives and revenue methods provide for the financial viability of the rideshare system. Participant security is monitored in near real-time using location-determining communication devices used by the participants in the system. The rideshare system monitors a number of security-indicating criteria and takes action when an anomalous condition is recognized.

18 Claims, 12 Drawing Sheets

U.S. PATENT DOCUMENTS

| | | |
|---|---|---|
| 6,611,755 B1 * | 8/2003 | Coffee et al. ................. 701/213 |
| 6,697,730 B2 * | 2/2004 | Dickerson ................... 701/200 |
| 6,862,524 B1 * | 3/2005 | Nagda et al. ................ 701/209 |
| 6,885,874 B2 * | 4/2005 | Grube et al. ................. 455/520 |
| 7,080,019 B1 * | 7/2006 | Hurzeler ..................... 705/1.1 |
| 2003/0100326 A1 * | 5/2003 | Grube et al. ................. 455/515 |
| 2004/0039504 A1 * | 2/2004 | Coffee et al. .................. 701/35 |
| 2004/0193368 A1 * | 9/2004 | Sanqunetti ................... 701/207 |
| 2005/0085257 A1 * | 4/2005 | Laird et al. .............. 455/550.1 |
| 2005/0151619 A1 * | 7/2005 | Forest et al. ................ 340/5.26 |
| 2006/0142913 A1 * | 6/2006 | Coffee et al. .................. 701/35 |
| 2006/0155460 A1 * | 7/2006 | Raney ........................ 701/207 |
| 2007/0146163 A1 * | 6/2007 | Annoni et al. ........... 340/932.2 |
| 2007/0150140 A1 * | 6/2007 | Seymour ..................... 701/35 |
| 2008/0112300 A1 * | 5/2008 | Kumhyr et al. ............... 369/83 |

OTHER PUBLICATIONS

IBI Group, "Intergrating Traveller Services: The Ride Points System," http://www.tc.gc.ca/tdc/publication/pdf/14300/14389e.pdf, (Apr. 2005).

Steven Levy, "Levy: Is Carpooling With Strangers The Way Of The Future?" http://www.msnbc.msn.com/id/18108841/sit/newsweek, (Apr. 2007).

Nuride, "Here's How It Works," http://www.nuride.com/nuride/Public/How_it_works.jsp, (2007).

The Rideshare Company of Greater Hartford, Connecticut, http://www.rideshare.com/index.html (2007).

* cited by examiner

SYSTEM AND METHOD FOR SECURITY ENHANCED RIDESHARE

FIELD

This application relates in general to ridesharing in a transportation system and, in particular, to a system and method to encourage participation, match participants and provide security for participants in a rideshare program.

BACKGROUND

Interaction with transportation systems is a daily fact of life for most everyone. Whether it is a public bus system or private car, getting from one place to another seems increasingly more difficult and costly. Road congestion, burdensome fuel prices and environmental concerns beg for alternatives. Existing alternatives each have their own pluses and minuses. For example, public transportation is relatively inexpensive and safe, but participants are restricted to certain routes and schedules that are unlikely to meet everyone's needs. Use of a private car personalizes routes and schedules, but is expensive in terms of fuel, pollution, and required road infrastructure.

Rideshare programs have been proposed that attempt to match public riders with private drivers. In a rideshare program, a private driver agrees to provide transportation to a rider traveling in generally the same direction at generally the same time. A significant advantage to these rideshare programs is the more efficient use of resources, including cars, fuel and roads. Participants might be slightly inconvenienced in terms of routes and schedules to accommodate the needs of other riders. There are transaction costs to matching riders with drivers in terms of both time and compensation, which must be worthwhile to all parties to encourage use of the system. Examples of rideshare systems are described in U.S. Pat. No. 4,360,875, issued Nov. 23, 1982 to Behnke and U.S. Pat. No. 6,697,730, issued Feb. 24, 2004 to Dickerson, the disclosure of which are incorporated by reference.

Rideshare programs may also introduce issues for participants not present when they make their own way. For instance, besides destination and time, there may be issues with compatibility and compensation. Participants are prudent to be concerned with their own security when matched with participants previously unknown to them. Monitoring the security of the participants during the trip and the success of the rideshare would also be of benefit. There exists a need to encourage the participation of participants in a rideshare program, to match participants based upon compatibility and to enhance the security of the participants while participating in the rideshare. The present invention provides such methods and systems, among the other advantages described below.

SUMMARY

A rideshare method and system is provided that includes, among other aspects, rideshare transaction matching, participant security, participation incentives and rideshare system financing. Rideshare participant devices are made available to rideshare participants. The rideshare participant devices have both communication capabilities and provide location information. An embodiment of the rideshare system communicates with the rideshare participants to facilitate rideshare transaction matching and to provide participation incentives. The rideshare participant device is also employed by the rideshare system to monitor and track the rideshare transaction while it is in progress.

Participant security in rideshare transactions is provided. The rideshare system monitors the rideshare transaction while in progress and determines the security of the rideshare participants. In an embodiment, one or more of the rideshare participant devices are monitored in near real time. Information obtained from the rideshare participant device is analyzed for anomalies that might indicate a security concern. For example, the location of the participant device during the rideshare transaction can be compared to a trip route and a security alert triggered if that location deviates from the expected trip route by more that a predetermined threshold. The trip route may further be specified by the rideshare system to account for communication connectively advantageous to near real time monitoring. Other concerns, such a route visibility to the public and the availability of emergency services may be utilized in the selection of the trip route.

In another embodiment, rideshare participant devices are available to a plurality of rideshare participant. For example a driver and a passenger each have access to a rideshare participant device. The rideshare system monitors and utilizes the plurality of rideshare participant devices to provide security. The rideshare system may communicate security inquires to rideshare participants via their rideshare participant devices when a security alert is determined. Responses to the security inquiry may be confirmed by the rideshare system against pre-arranged confirmation tokens, such as personal identification numbers or biometric information. The rideshare system may also compare location information obtained from the participant devices to determine anomalous conditions, such as when the location of the rideshare participant devices diverges before the rideshare transaction is expected to conclude.

The rideshare system also provides rideshare matching based at least in part on participant ratings. The rideshare system may make the match or may involve the rideshare participants in the match process. For example, experiences of the participants as drivers or passengers in previous rideshare transactions may be tracked and evaluated. Compatibility of the participants may be estimated by evaluations of social networks or common interests. Objective data, such as driving behavior or heath conditions is also used in embodiments to determine a rideshare transaction match. Rideshare participants may also specify filters for metrics that the participant desires the other participant to meet.

The rideshare system provides participation incentives for drawing in and retaining rideshare participants. These incentives may include providing free or discounted products utilized or relevant to the rideshare system, such as rideshare participant devices, navigation systems or insurance policies. Other incentives might make the rideshare transaction safer or more pleasant, such as providing vehicle inspections or vehicle cleaning services.

The rideshare system also provides business methods for self-financing. In an embodiment, the rideshare transactions are fee based, with the possibility of a fee split with one or more of the rideshare participants. The fee may be set through an auction process. In another embodiment, the rideshare system generates income through related products, such as arranging for or providing insurance policies.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Rideshare System Overview

Figure 1:
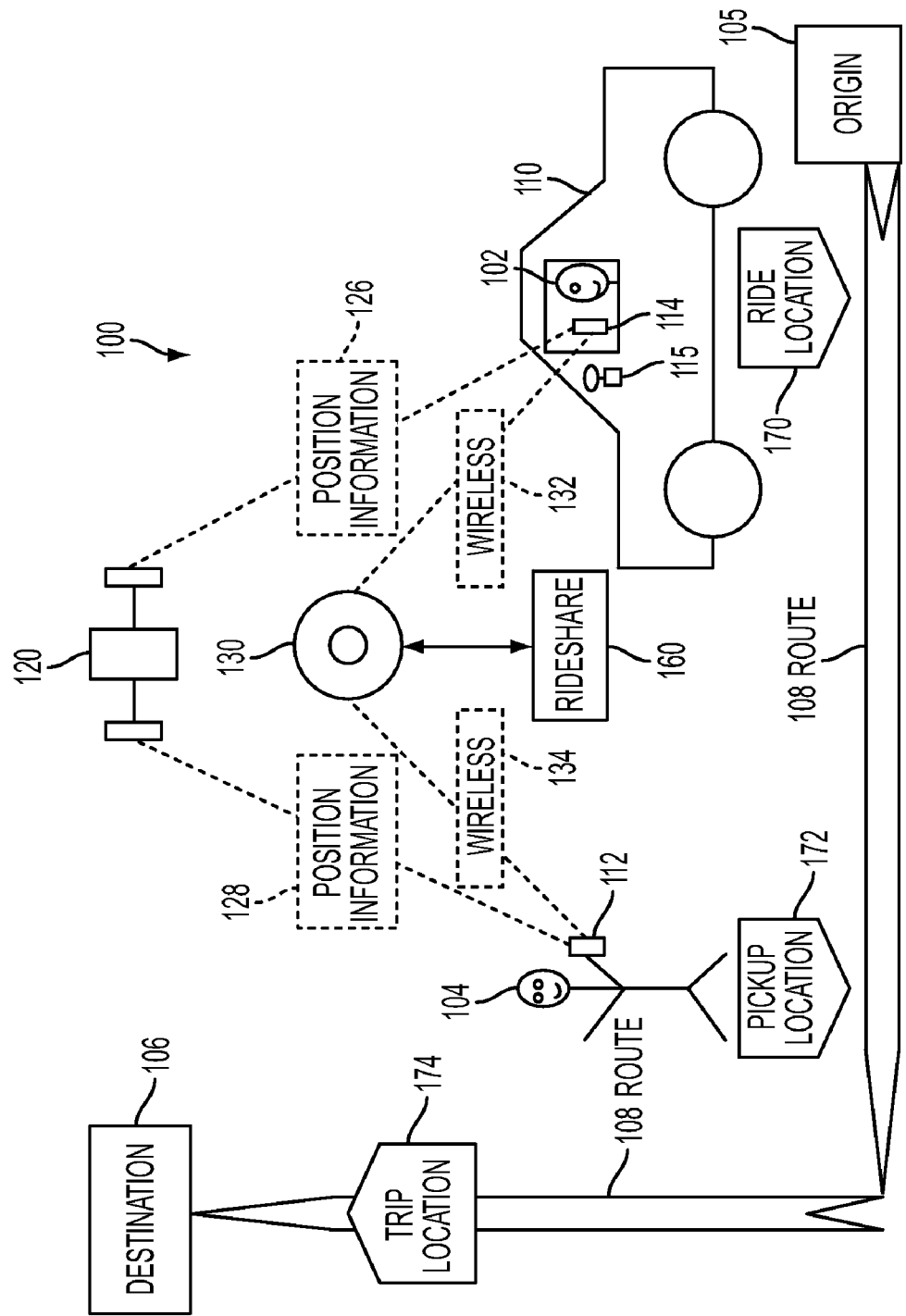
FIG. 1 is a block diagram showing, by way of example, a rideshare transaction utilizing location determining communication systems.

An overview of a rideshare system 100 is shown in FIG. 1. A rideshare is broadly defined as a transaction between a driver 102 and a passenger 104 that results in the transportation of the rideshare participants 102, 104 to a destination 106 along a route 108. The driver 102 provides transportation using a vehicle such as an automobile 110. Other forms of transportation may be provided, such as airplanes, trains or vans.

Each participant 102, 104 has available to him or her a rideshare device 112, 114. The rideshare device 112, 114 has communication capabilities and a location determining capabilities. The rideshare device 112, 114 communicates with a location broadcast station 120 and a communication broadcast station 130. Commonly, the location broadcast station 120 is a satellite, such as a global positioning satellite provided by the United States government. Examples of communication broadcast stations 130 include cellular towers, WI-MAX broadcasters, WiFi broadcasters, walkie-talkie and other forms of radio communication. The location broadcast station 120 and the communication broadcast station 130 may be combined into any convenient form, satellite or terrestrial.

The rideshare device 112, 114 may be any type of presently known or future developed communication device. Communication systems are quickly being combined such that computer devices are providing various combinations of voice, text, e-mail, instant messaging, video, pictures and other forms of communication between devices. For example, the rideshare device 112, 114 may be a cellular telephone with GPS (global positioning satellite) capabilities. GPS capabilities enable determining the three spatial coordinates of the device and the fourth dimension of time at or near when that determination is made. The location of the device generally refers to the three spatial coordinates of the device at a particular time.

To simplify the following discussion, the rideshare device 112, 114 will generally be discussed as if it is a cell phone with GPS capabilities, but limitation to this type of device is not intended. The participant device 112, 114 includes, or has access to, a location system such as GPS or other locating strategies. GPS systems determine location by measuring the time differentials for location signals 126, 128 coming from GPS satellites 120 orbiting the earth. Similarly, a cellular telephone, or similar device, can be located by triangulating communication signals 132, 134 originating from the device 112, 114 received at a plurality of broadcast stations 130.

A rideshare system 160 interfaces with the rideshare devices 112, 114 through the communication broadcast station 130. The rideshare system 160 arranges and administers a rideshare transaction between a driver 102 and a passenger 104. The rideshare transaction occurs along a route 108 starting at an origin 105 and concluding at a destination 106. As discussed below, the rideshare system 160 determines a driver location 170 using the location capabilities of the driver device 114. The driver location 170 may be the origin 105 or any point along the route 108 as the vehicle 110 is in transit. A pickup location 172 is determined from the location capabilities of the passenger device 112. The application 172 need not be the actual location of the passenger device 112, for instance a safer nearby pickup location may be specified by the rideshare system 160. Safety functions provided by the rideshare system 160 include the monitoring of a trip location 174 as the passenger 104 shares the transport 110 with the driver 102.

Figure 2:
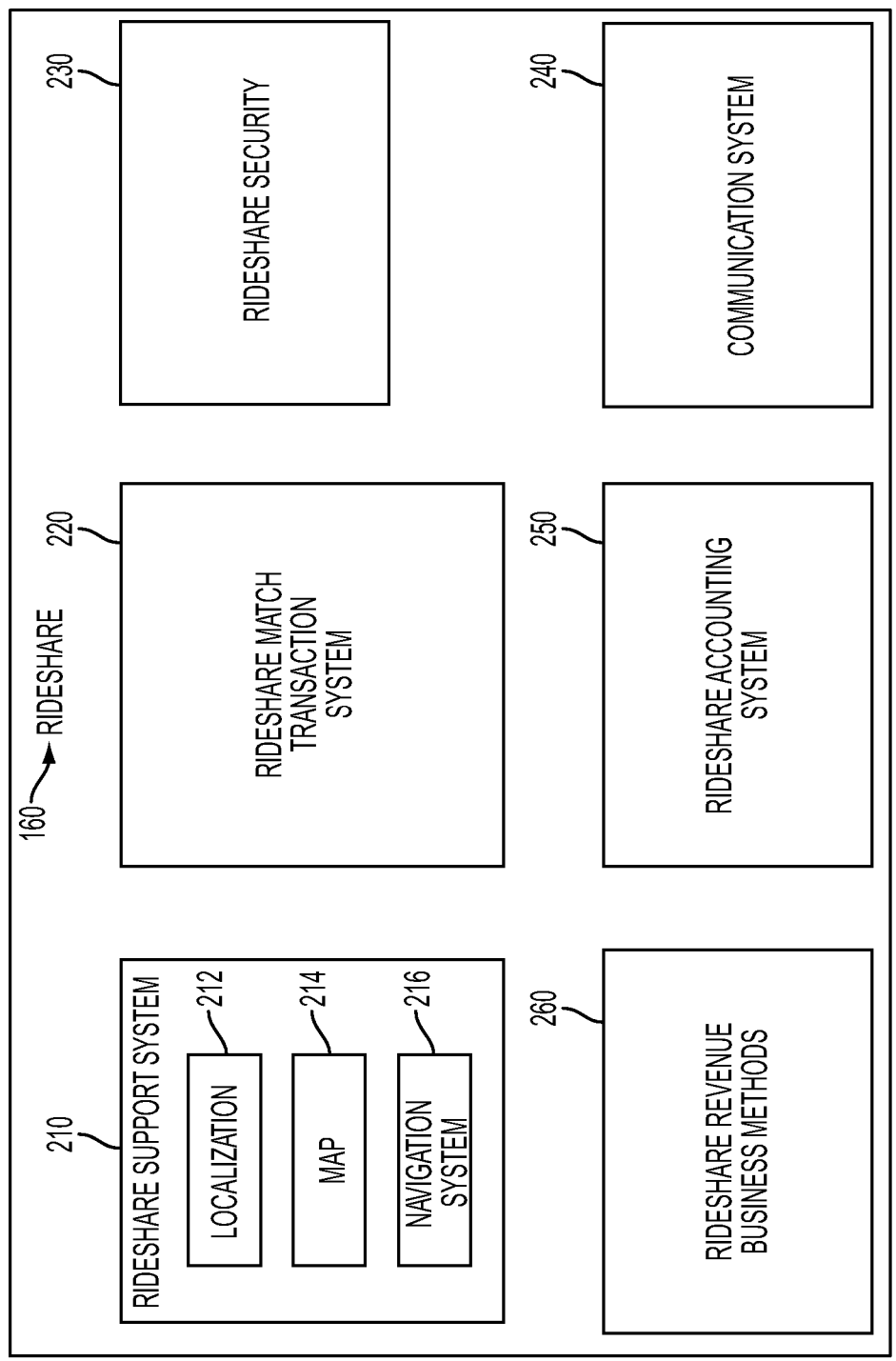
FIG. 2 is a block diagram of an exemplary rideshare system.

The rideshare system 160 includes a number of subsystems shown generally in block form in FIG. 2. The rideshare system 160 may be used in a number of transportation contexts and locations. For example, the rideshare system 160 may support commuting in different metropolitan areas within the same or different countries. A rideshare support system 210 provides a localization module 212 that may provide directions and instructions translated for, or otherwise tailored to, a particular location. A map module 214 provides transportation maps, for example roadmaps of the transportation coverage area administered by the rideshare system 160. Navigation systems support 216 provides navigation functions such as driving directions and may be interfaced with location determining systems such as GPS or the location determining functions of the participant devices 112, 114.

A rideshare match transaction system 220 generally includes functions for matching participants 102, 104 in a rideshare transaction. A rideshare security module 230 tracks and monitors the participants 102, 104 during the rideshare transaction. The various components 210, 260 of the rideshare system 160 employ a communication system 240. For example, the rideshare match transaction system 220 may utilize the participant devices 112, 114 to arrange a rideshare transaction and also to track and monitor participant security via the rideshare security module 230. The communication system 240 may also interface the components 210, 260 of the rideshare system 160 via wired or wireless communications systems, such as a wide area network, local area network, or cellular communication network.

Rideshare accounting system 250 provides functions for the monetary and non-monetary administration of the rideshare system, for example, tracking and accounting for: rideshare transactions; financial negotiations for rideshare between participants 102, 104; fees and commissions that may be taken by the rideshare system 160; revenues generated by the rideshare revenue business methods 260; expense allocations; and, rideshare participation incentives. Rideshare revenue business methods 260 provide profit and financing alternatives for the rideshare system 160.

Participant Matching

Figure 3:
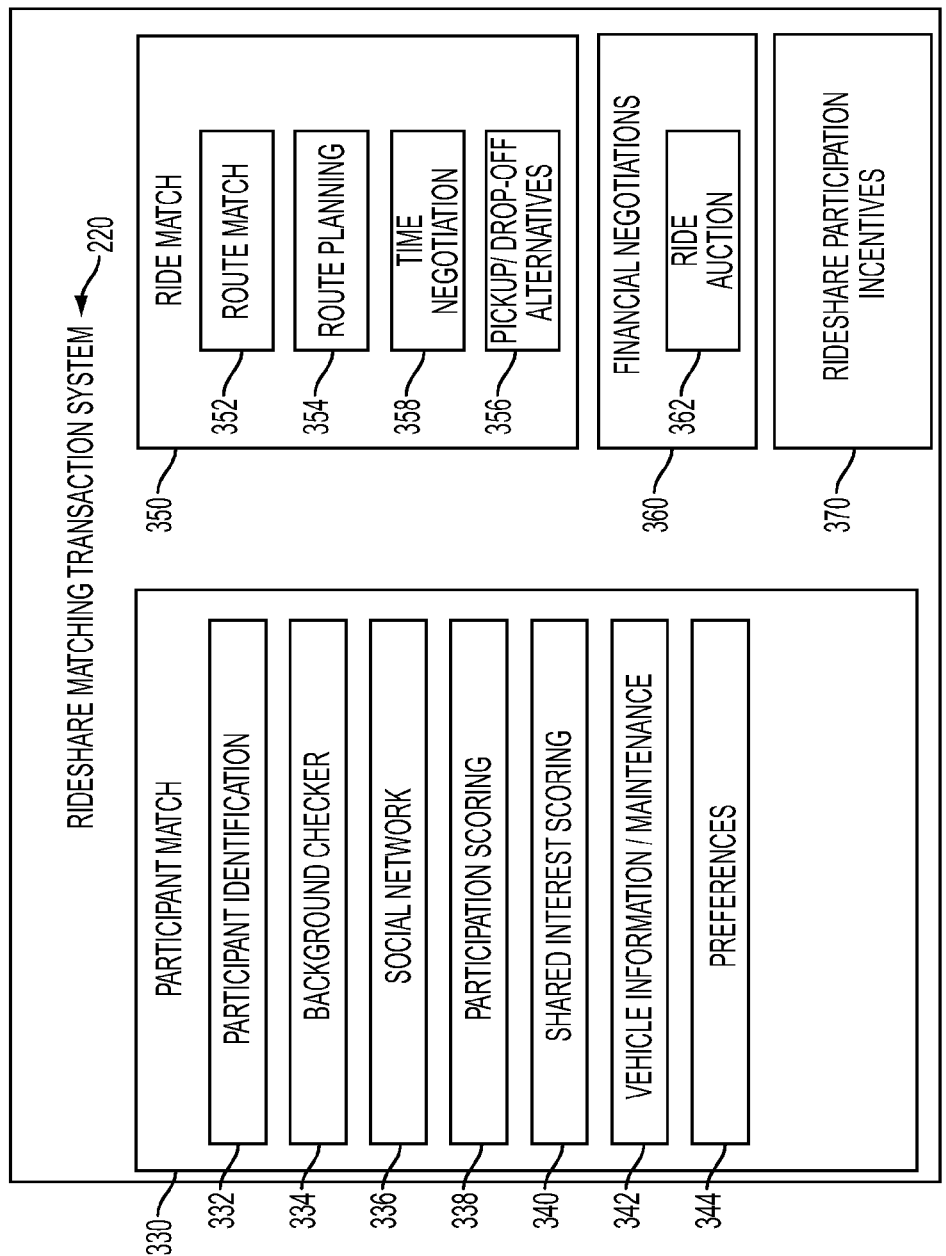
FIG. 3 is a block diagram of an exemplary rideshare matching transaction system.

Turning to FIG. 3, the ride matching transaction system 220 includes a participant match component 330, a ride match component 350, a financial negotiations component 360 and a rideshare participation incentives component 370 that in various combinations match rideshare participants 102, 104 using dimensions beyond just a shared route. The participant match component 330 matches participants 102, 104 using either or both social and security considerations. The identification of a participant is performed by a participant identification component 332. The identification may be confirmed by the participant component 332, for instance, by biometric input, video input or passwords. Background information associated with the identity of the participant can be referenced and utilized by a background checker component 334.

Participants 102, 104 can also be matched by a social network component 336 using social network information maintained by either the rideshare matching transaction system 220 or third party social network systems. For example, a driver 102 may wish to only be matched to passengers 104 identified as friends (first degree relationships) or friends of friends (second degree relationships). A participation-scoring component 338 may maintain information documenting the participation of the participants 102, 104. The participation information may include such values as the number of successful rideshare transactions that the participant has participated in, feedback scores from other participants that have participated in rideshare transactions with the subject participant or recommendations from other rideshare participants.

The shared interest-scoring component 340 determines and compares either or both biographic or behavioral information. Examples of biographic information might include gender, age, hobby, profession and music preferences. Examples of behavioral information might include smoking or non-smoking preferences. The participant match component 330 may utilize information other than that directly associated with a participant. For example, a vehicle information component 342 may obtain and utilize information pertaining to the characteristics of the vehicle 110, such as vehicle size, number of available seats, insurance safety ratings and the like. Vehicle maintenance and safety inspections are other examples of information associated with the vehicle 110 that may inform a participant 104 directly, or the participant match component 330 automatically, to arrange a rideshare match transaction.

The participant match component 330 also provides for a preferences component 344, which may require, or give preference to, certain participants or classes of participants. For example, priority may be given to corporate sponsored users, participants with nearby home or work locations, participants with good participant ratings, or participants with certain group associations.

The ride match component 350 includes systems and methods for the transportation specifics of the rideshare transaction. A route match component 352 determines a route 108 that corresponds to a location 170, a proposed pickup location 172 and a destination 106. To coordinate a route 108 that meets the criterion of the ride location 170, the pickup location 172 and the destination 106, the route match component 352 may determine a suitable route with a route-planning component 354. A pickup and drop-off alternatives component 356 may suggest an alternative pickup or drop-off location that complies with route planning objectives, such as choosing routes with consideration for the safety of the participants, as is discussed in more detail below. The ride match component 350 may also undertake the negotiation of elements that the participants may be flexible with, for example negotiating the time of pickup using a time negotiation component 358.

The rideshare matching transaction system 220 may also include a financial negotiations component 360, whereby the participants negotiate compensation for the rideshare transaction. For example, a ride auction component 362 may administer bidding between one or more passengers 104 for a seat in a vehicle 110 along a particular route 108. The rideshare matching transaction system 220 may also take into account rideshare participation incentives administered by a rideshare participation incentives component 370.

Participation Incentives

Figure 4:
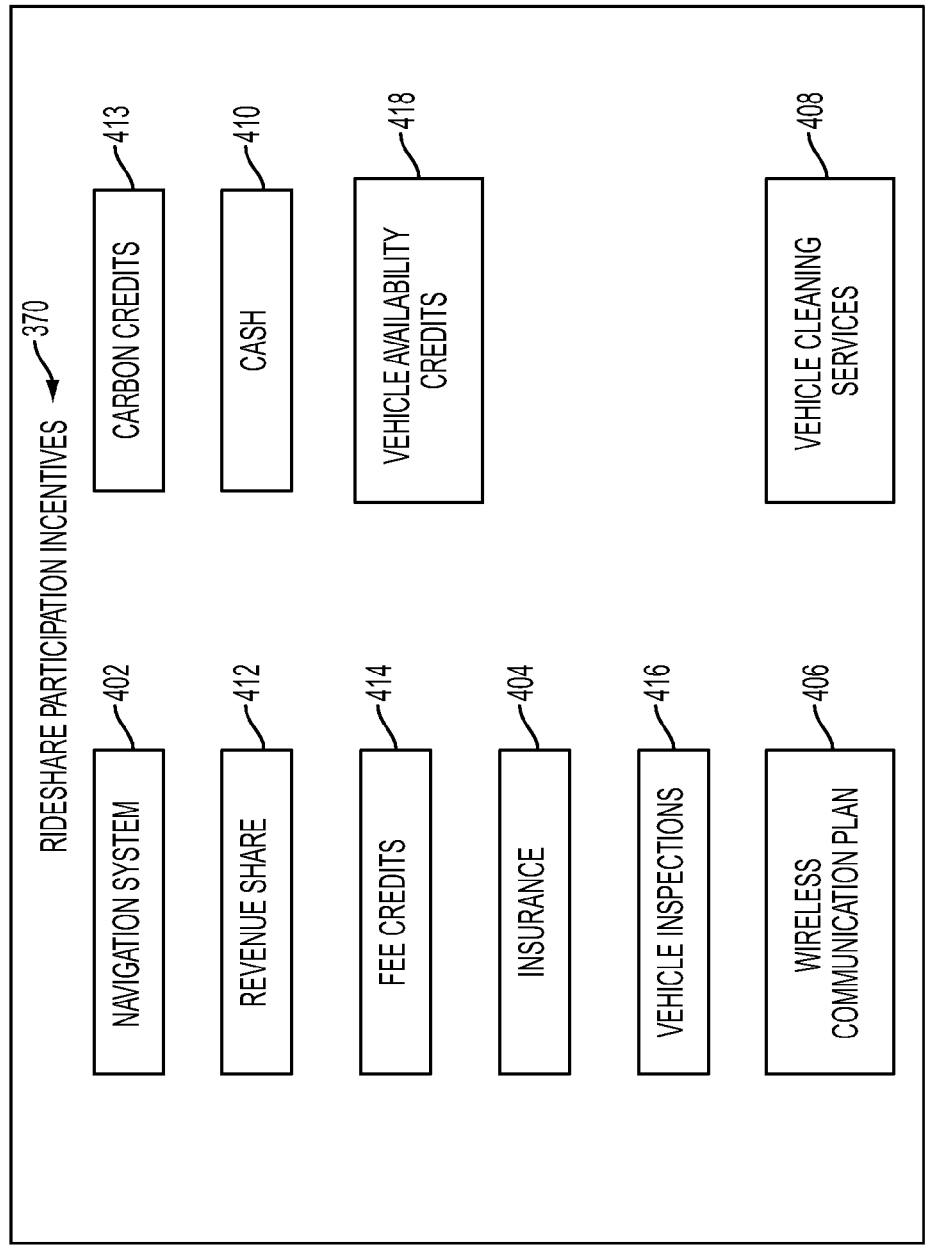
FIG. 4 is a block diagram of an exemplary rideshare participation incentives component.

A block diagram of the rideshare participation incentives component 370 is shown in FIG. 4. Participation incentives encourage the use of the rideshare program by a diverse group of participants. These participation incentives may be monetary or non-monetary. For example, participants may be awarded prizes or recognition, as well as, cash and discounts. Tie-in promotions are advantageous with the providers of insurance services, wireless communication plan providers, and navigation systems, to name only a few examples. Participation incentives provided by the rideshare participation incentives component 370 include providing a free or discounted navigation system 402 for vehicle 110 and giving free or discounted insurance 404 against liability occurring while participating in the rideshare program. Free or subsidized wireless communication plans 406 and free or subsidized vehicle cleaning services 408 may also be offered as incentives. A rideshare participation incentive 370 might also include inducements 418 to actively participate in the rideshare system 160; for instance, a driver 102 may be given graduated fee credits tied to the percentage of time a driver 102 makes his vehicle 110 available for rideshare transactions.

Examples of monetary participation incentives include cash payments 410, sharing of revenue 412 collected by the rideshare program, or credit against fees 414 charged by the rideshare program. For many participants, a primary advantage of participating in a rideshare program is the benefit to the environment. Recognition, in the form of carbon credits 413, is a powerful incentive to those participants. A carbon credit is a value assigned to quantify the savings in carbon emissions caused by the participant's choice to engage in the rideshare transaction. The value of a sale of carbon credits may extend beyond just recognition, as there is a market developing to trade carbon credits for monetary and other consideration, such as offsetting rights to generate carbon from other activities.

Revenue Business Methods

Figure 5:
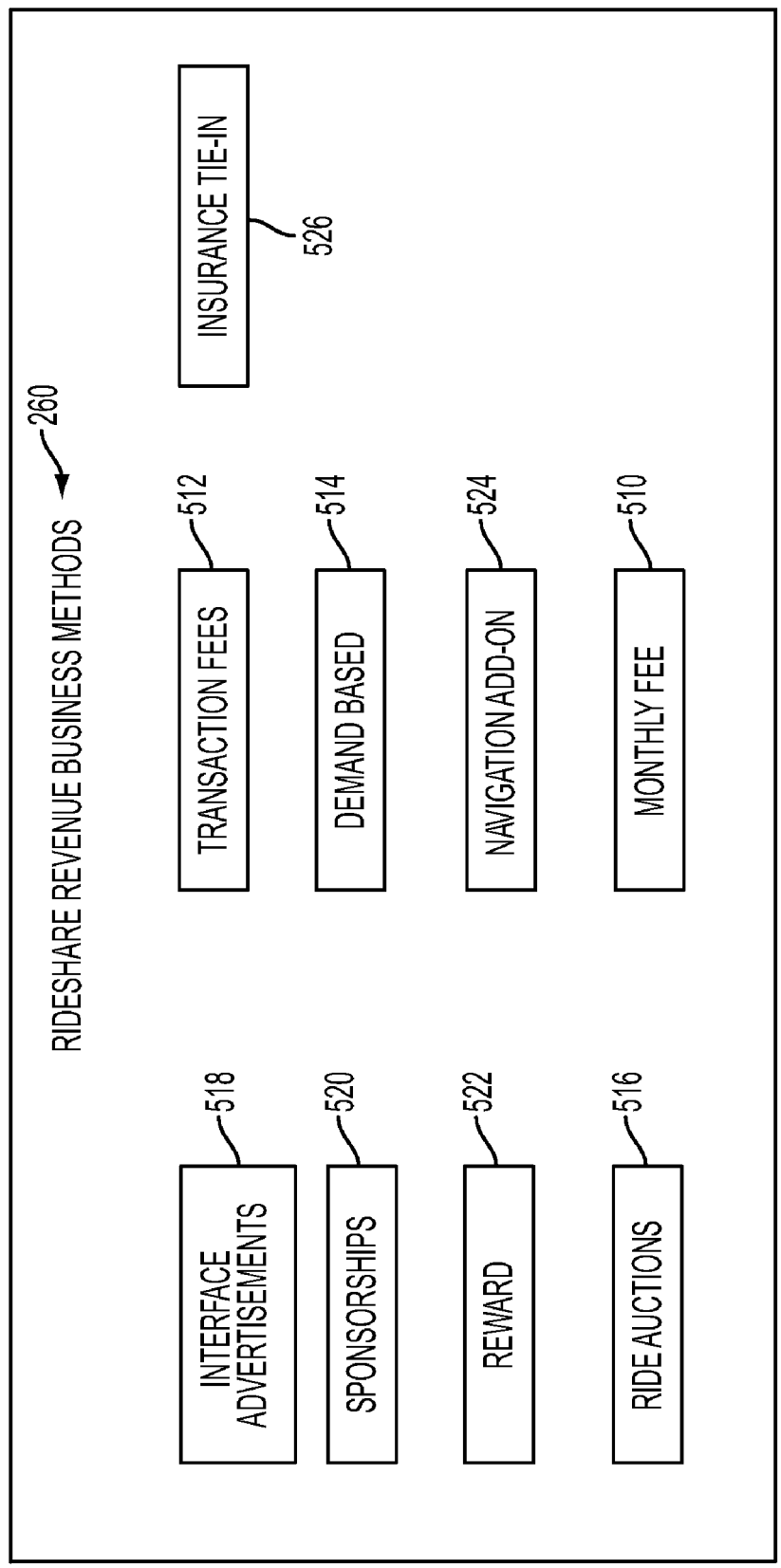
FIG. 5 is a block diagram of exemplary rideshare revenue business methods.

Referring to FIG. 5, the rideshare system 160 provides rideshare revenue business methods 260. Revenue may be provided to operate the rideshare system 160 may include monthly fees 510 or per transaction fees 512. Fees may be adjusted, up or down, based upon the monitoring of supply and demand 514. For example, when there are more passengers 104 then drivers 102 seeking transportation on a given route 108, the demand based monitoring component 514 may increase the transaction fee 512. Similarly, if there are more drivers 102 offering transportation on a route 108 then there are passengers 104 willing to participate, the demand base component 514 may lower transaction fees 512 to encourage additional passengers 104 to participate in a rideshare transaction. As discussed above, or rideshare auctions 516 may be conducted directly between rideshare participants 102, 104, setting the price of the rideshare transaction through bidding. The rideshare system 160 may take a percentage of these ride auctions.

The rideshare revenue business methods 260 may also include revenue sources originating beyond the participants of the system. For example, advertisements 518 may be sold to third party advertisers for display on interfaces provided by the participant devices 112, 114. Third party organizations may offer sponsorships 520 compensating the rideshare program 160 and permitting the third party organization to obtain the public relations value of supporting a worthy program. Third party organization may also benefit by providing reward programs 522 subsidizing rideshare transactions. Providers of products used in the navigation system 115 may also provide promotional tie-ins, such as giving memberships in the rideshare system 160 with the purchase of a navigation system 524.

Insurance is a significant issue in any rideshare system and an opportunity for revenue. Systems and methods for insurance integration 526 derive revenue from the integration of insurance coverage with the rideshare system 160 for example; low cost, month-to-month insurance premiums can be collected to provide users with additional insurance coverage that protects them while participating in a rideshare transaction. Supplemental insurance policies may also be offered on a per rideshare transaction basis that insure against liability incurred during the rideshare transaction. These supplemental insurance policies could be charged on a per rideshare transaction basis or on a monthly unlimited rideshare transaction basis. The rideshare system 160 could act as the insurer or share in the revenues generated from these supplemental insurance policies, for instance, by collecting something similar to an agent's a fee.

Rideshare Security

Figure 6:
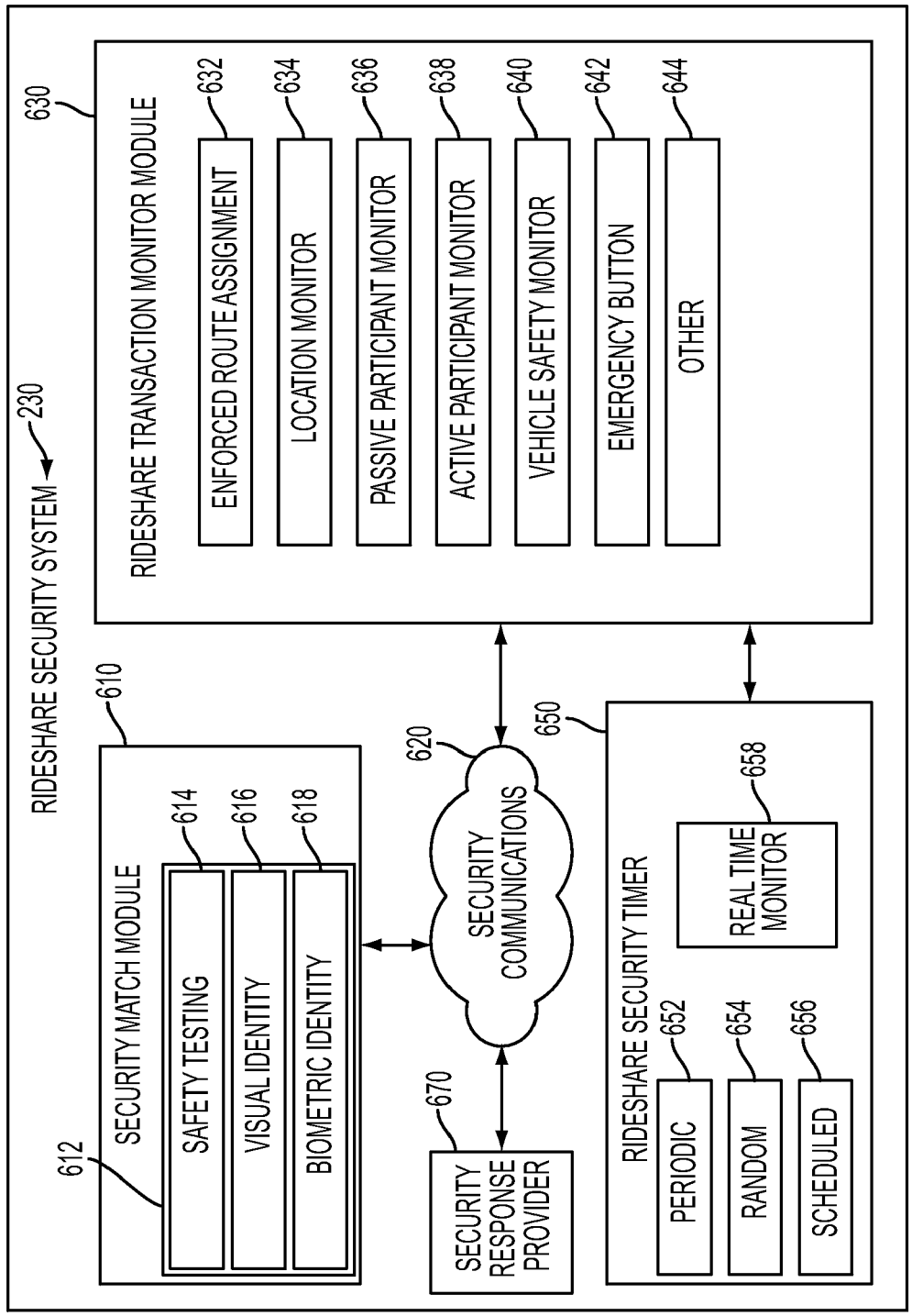
FIG. 6 is a block diagram of an exemplary rideshare security system.

The rideshare security system 230 is further described with reference to FIG. 6. A security match module 610 provides participant matching functions 612 with a security focus. The security match module 610 may be implemented as an extension of the rideshare matching transaction system 220. A safety testing function 614 might test for indicators that a driver 102 is intoxicated, for instance by asking the driver 102 to solve a puzzle or demonstrate response time through the driver device 114. A visual identity 616 or biometric identifier 618 are matching functions that match identities at the time the passenger 104 is picked up by the driver. For example, either or both of the participants 102, 104 could be sent a picture of the other participant 102, 104 for viewing on their participant device 112, 114 when the participants 102, 104 meet at the pickup location 172. The identity of either or both of the participants 102, 104 may be confirmed at the pickup location using biometric information associated with that participant, by communicating 620 with the rideshare system using the participant device 112, 114.

A rideshare transaction monitor module 630 sets conditions for and monitors the security of the rideshare participants 102, 104 while the rideshare transaction is in progress. The transaction monitor module 630 works in conjunction with a rideshare security timer 650. The rideshare security timer 650 triggers monitors 634-640 to assess the safety of the participants 102, 104 at periodic intervals 652, randomly 654 or at scheduled times 656 during the rideshare transaction. For example, the rideshare security timer 650 might periodically request from a participant to provide a security response to an active participant monitor 638. Similarly, a passive participant monitor 636 measures and reports a metric using a participant device 112, 114, but without the active participation of the participant 102, 104.

Some security functions are monitored in real-time 658. Real-time monitoring occurs at or near an event and is subject to communication lags and other technical limitations. For example, a location monitor 634 may monitor the location of the vehicle 110 in real-time as the vehicle traverses the route 108. The location of the vehicle may be determined using the location capabilities of either participant device 112, 114 or using a navigation system 115 associated with the vehicle 110. If either of the participant devices 112, 114 or the navigation system 115 deviates from the route 108 by more that a pre-defined threshold, the rideshare security system might take a security action. Examples of the security scenarios are discussed below.

The rideshare security system 230 may also respond to asynchronous notifications initiated by a participant device 112, 114. For example, an emergency button 642 would be communicated 620 to the rideshare security system 230, which might initiate a security response, such as contacting a security response provider 670. Other security monitoring, whether initiated by the rideshare transaction monitor module 630 or a participant device 112, 114, asynchronous or synchronous, periodic, random, scheduled or monitored in real-time, are possible and contemplated by the present invention.

Examples of Rideshare Security

The following examples of the rideshare security systems and methods are broadly separated into server-based and device-based strategies. A server-based security check is initiated by a server associated with the rideshare system 160 and interacts with either or both of the participant devices 112, 114 or a navigation device 115. A device-based security check is initiated by a participant device 112, 114 and interacts with the server to evaluate the security alert and administer a security response, when appropriate. Security checks may include either or both active participant checks, which anticipate the participation of the participant in the security check, and passive participant checks, which judge information obtained without the active participation of the participant. These categories are defined for the purposes of simplifying the following discussion and are not intended as limitations. Also, while examples of security checks may be discussed individually for clarity, those taught or suggested by the examples may be used in various combinations in the embodiments of the invention.

Figure 7:
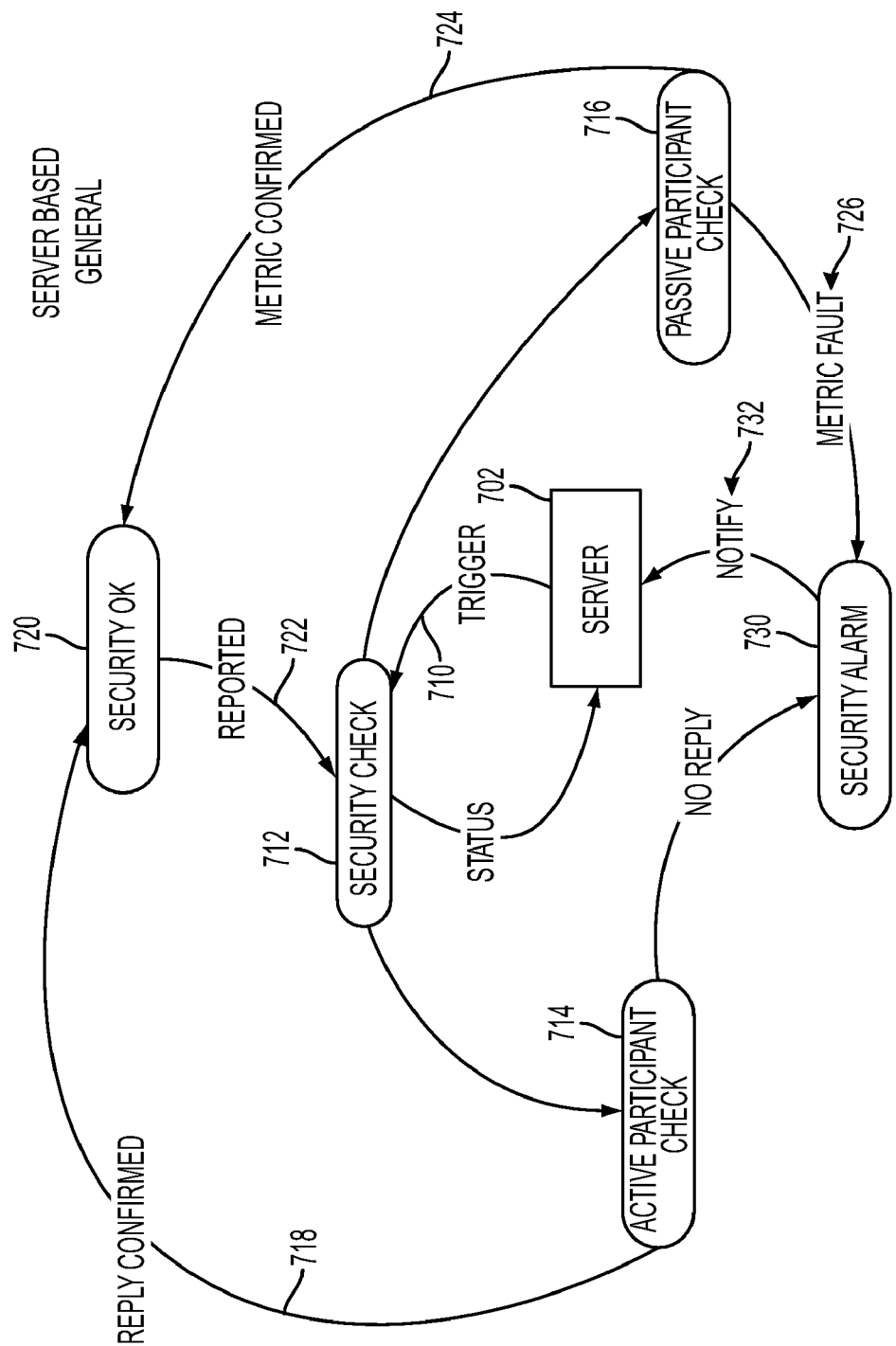
FIG. 7 is a state diagram illustrating a general scenario for server-based security checks.

FIG. 7 is a state diagram illustrating exemplary server-based security checks. A server 702 triggers 710 a security check 712. The trigger 710 may be periodic, random or scheduled. The security check 712 may include an active participant check 714, a passive participant check 716, or both. For instance, an active participant check 714 may include sending a message to a participant device 112, 114 and requesting a reply message. The reply message may include an indication of the participant's perception of the security situation, and an identity token such as a password or biometric confirmation. If the reply is confirmed 718, the security state is determined to be OK 720, which is reported 722 to the security check 712. If the active participant check 714 fails, a security alarm 730 is raised and reported 732 to the server 702.

A security check 712 may also request a passive participant check 716 that checks security information against metrics generally without the participation of the participant 102, 104. If the metric is confirmed 724 to be within a range determined to be safe, the security state is determined to be OK 720 and is reported to the security check 712. When the metric is determined to be out of range 726, a security alarm 730 is raised. The security alarm 730 notifies 732 the server 702 of the unsafe security situation. The server 702 may then take appropriate action, such as performing other security checks to verify the security situation or reporting that security situation to a security response provider 670, such as the police.

Figure 8:
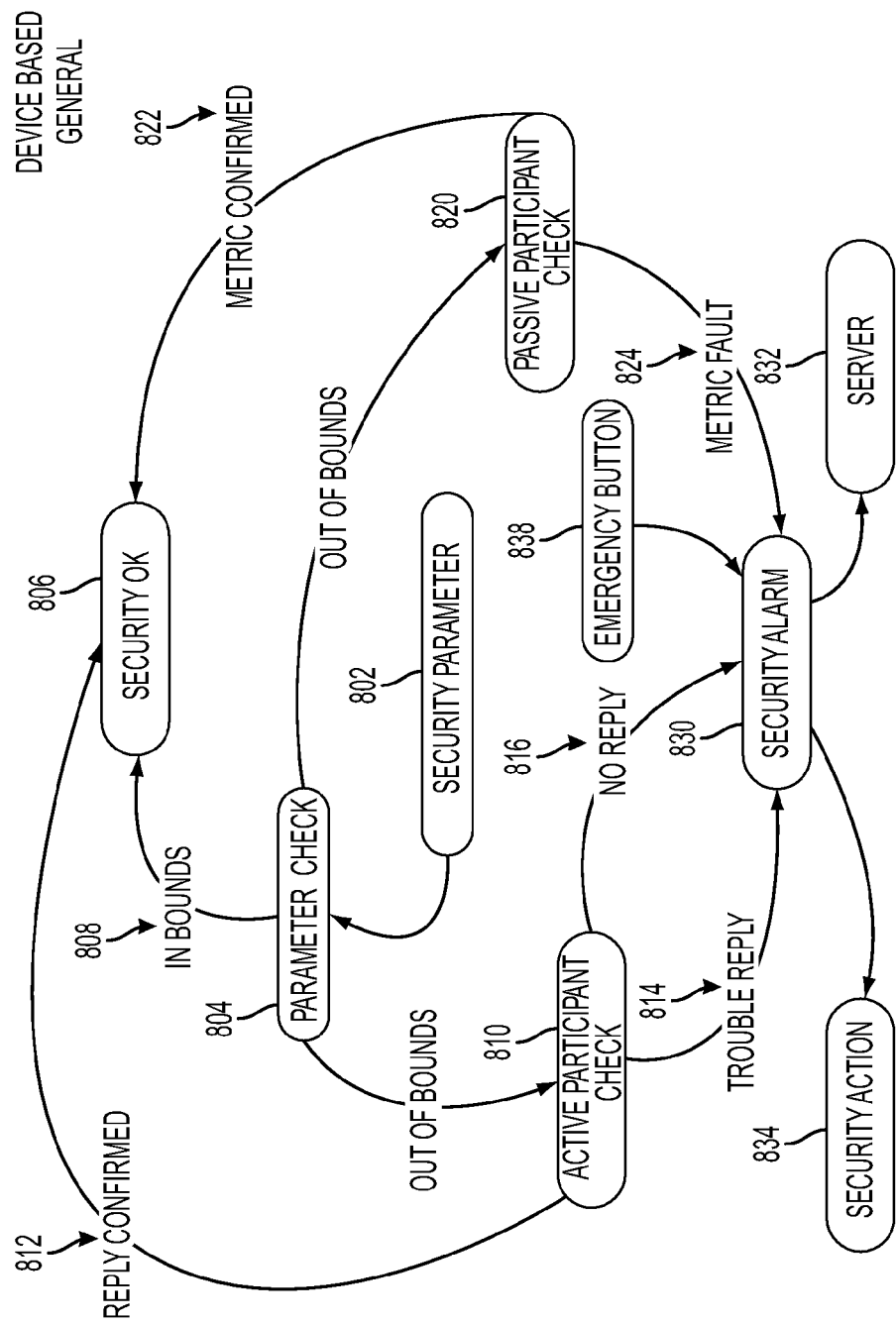
FIG. 8 is a state diagram illustrating a general scenario for device based security checks.

FIG. 8 is a state diagram illustrating exemplary device-based security checks. A device based security check is generally monitored by a participant device 112, 114. The security check may be either automated or responsive to something that a participant 102, 104 initiates. For example, a security parameter 802 is provided by a server 702 or directly programmed into a participant device 112, 114. A parameter check 804 monitors the status of information obtained from the participant device 112, 114 and maintains a status of security OK 806 as long as the information stays within pre-defined boundaries 808. If the information goes out of bounds, the participant device 112, 114 may direct the process to either an active participant check 810 or a passive participant check 820. For example, the active participant check 810 may request a reply from the participant and indicate that the security situation is OK 806 if the reply is confirmed 812. If the participant replies that there is trouble 814 or no reply 816 is received, then the process moves to a state of security alarm 830. A passive participant check 820 may check confirming metrics and either confirm 822 that security is OK 806 or the metric indicates a problem 824, triggering a security alarm 830. The security alarm 830 may then take further action by notifying a centralized server 832 or taking a direct action 834, for instance, by notifying a security provider. An emergency button 838 may directly cause entry into the security alarm 830.

Figure 9:
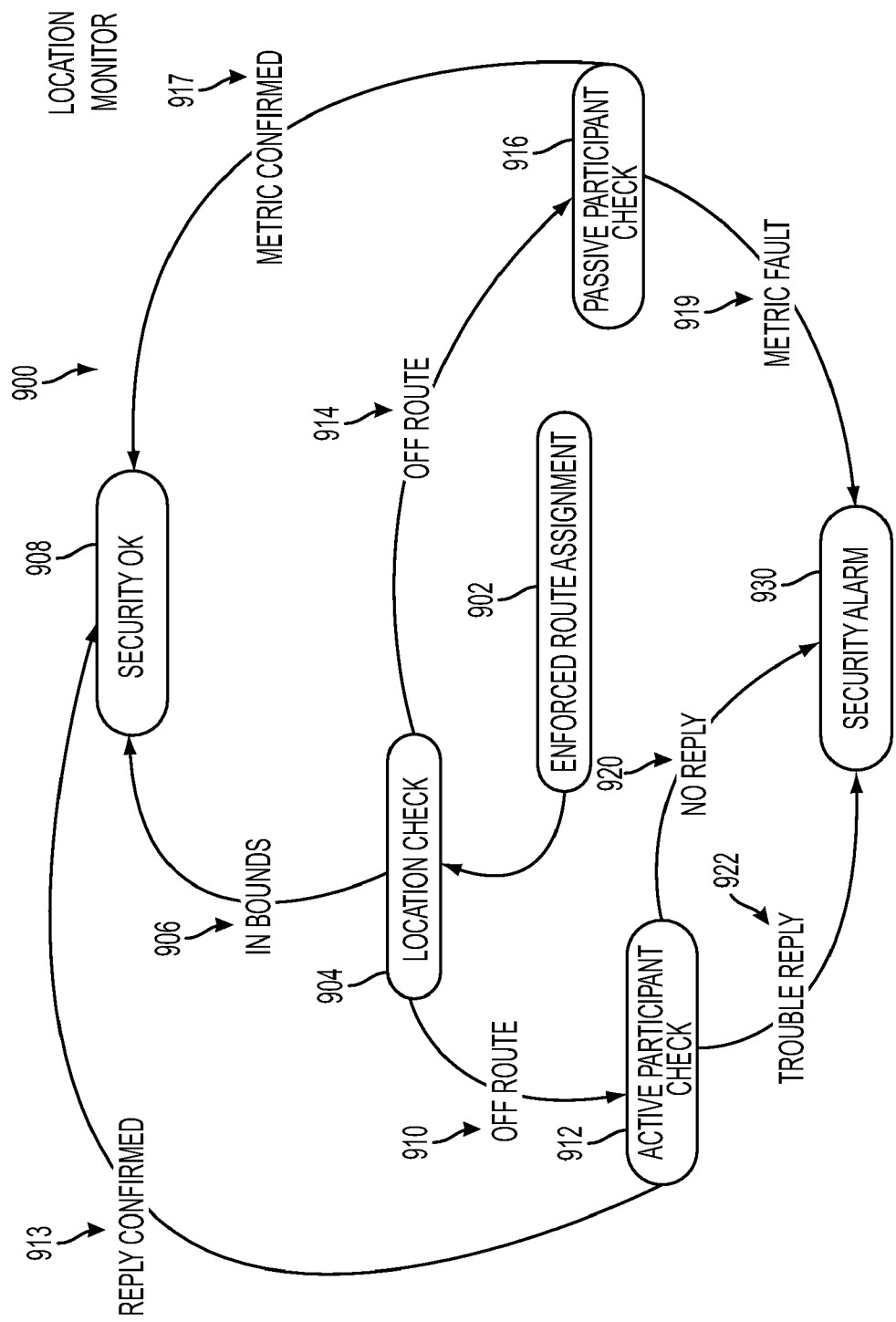
FIG. 9 is a state diagram illustrating an exemplary location security monitor.

FIGS. 9-12 illustrate exemplary embodiments of security monitoring systems and methods, which can either be implemented as server-based or device-based. Turning to FIG. 9, a security monitor determines the location of a participant device 112, 114 compares that location to an expected route 108 and triggers a security alarm when an anomaly is detected. The route 108 may be agreed to by the rideshare participants 102, 104, assigned by the transaction monitor 630 or other supporting server. In embodiments that either allow or force the assignment of the route 108, the transaction monitor 630 may choose a route based in part upon a safety profile of the route. The safety profile may take into account such factors as the exposure of the route to the public, the availability of communication connectivity along the route, and the anticipated law enforcement presence along the route.

Once the route 108 is determined, the location monitor 900 enforces the route assignment 902 by conducting a location check 904 at periodic, random or scheduled intervals. The trip location 174 is determined from either or both of the participant devices 112, 114 or a navigation system 115 associated with the vehicle 110. If the trip location 174 is within pre-defined boundaries associated with the route 108, the security status is considered in-bounds 906 and the security situation is maintained as OK 908. If the trip location 174 is not within the predefined boundaries associated with the enforced route assignment 902, the location monitor 900 may trigger an off-route 910 active participant check 912, or may trigger an off-route 914 passive participant check 916. A no reply 920 or a trouble reply 922 generates in a security alarm 930. If the reply is confirmed 913, the process returns to a security ok state 908. A passive participant check 916 may seek to verify the security situation, for instance by measuring other security-associated metrics, such as vehicle speed. The vehicle speed may be computed from the location information provided by either the participant devices 112, 114 or the navigation system 115 and the timestamps associated with that location information. If the metric is confirmed acceptable 917, the process returns to a security ok state 908. The security alarm 930 is entered if the metric is outside acceptable parameters 919.

Figure 10:
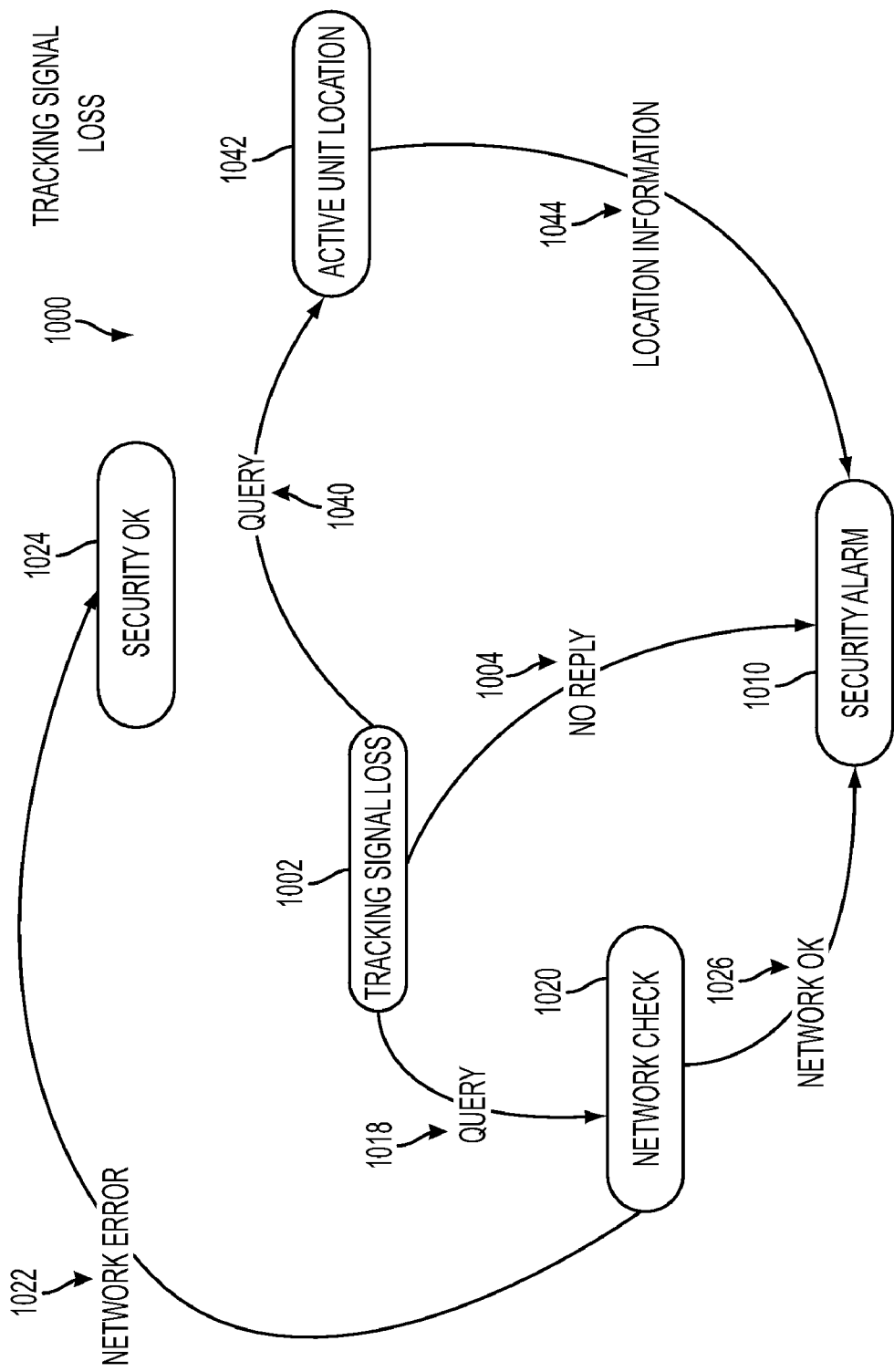
FIG. 10 is a state diagram illustrating an exemplary tracking signal loss security monitor.

FIG. 10 illustrates an exemplary monitor 1000 that tracks the participant devices 112, 114 in near real-time and responds if the signal from either of those devices becomes unavailable. If the tracking signal is lost 1002, a no reply condition 1004 may move directly to a security alarm state 1010. The monitor 1000 may also seek to determine if there is a condition that explains the signal loss, such as querying 1018 a communication network 1020 for its status. If there is a problem with the network 1022, the security state may be set to a security ok state 1024. The security alarm 1010 is moved to if the network status is confirmed as ok 1026. The monitor 1000 may also query active participant devices 112, 114 to determine the status of the lost signal or to determine helpful information, for instance, a starting location for a participant search, which is forwarded to the security alarm 1010.

Figure 11:
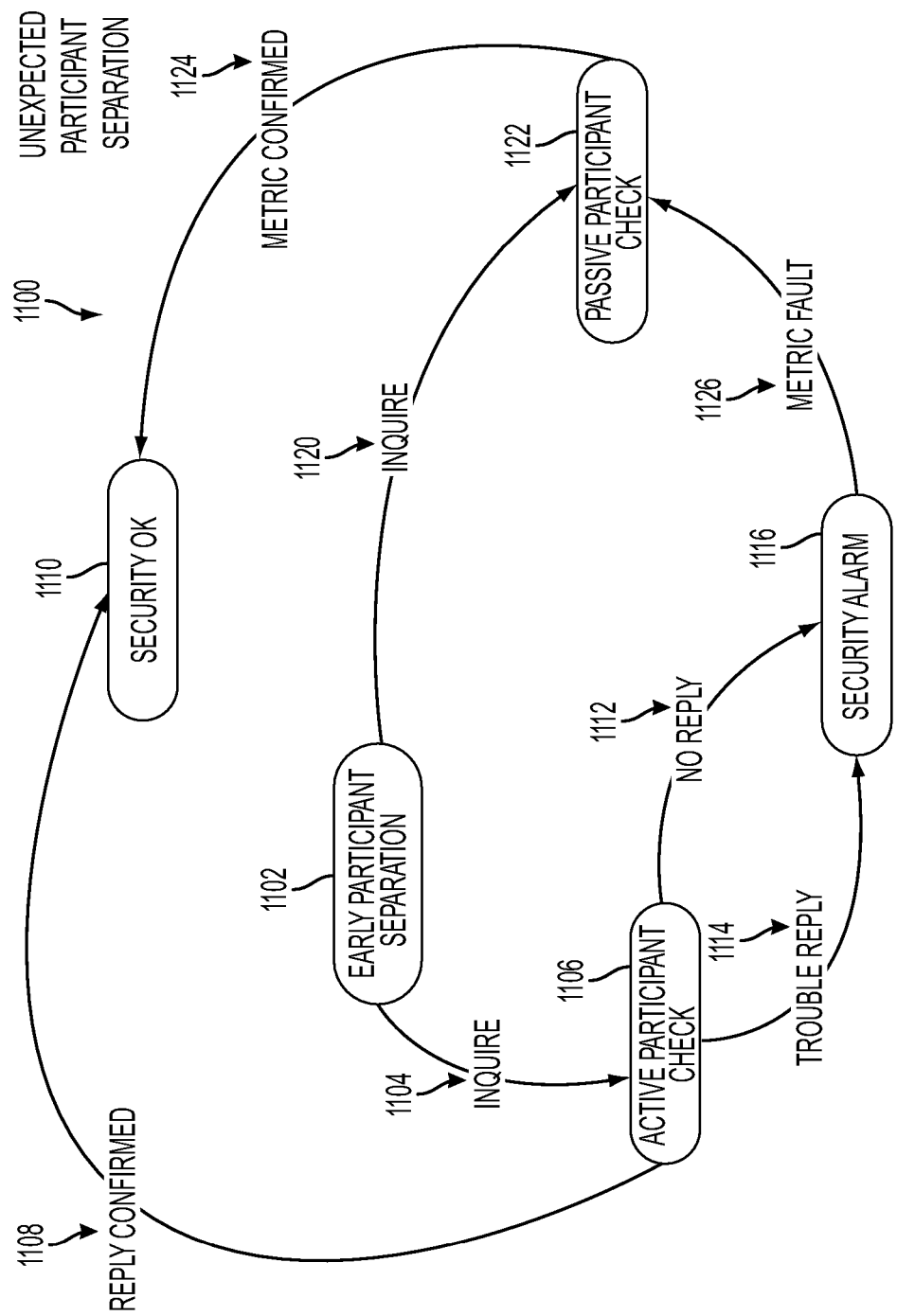
FIG. 11 is a state diagram illustrating an exemplary unexpected participant separation security monitor.

FIG. 11 illustrates an exemplary monitor 1100 that tracks the participant devices 112, 114 in near real-time and responds if the location information derived from those devices indicates that there has been an early and unexplained separation of the participants 102, 104. The early participant separation state 1102 notes an anomaly, it may inquire 1104 by moving to an active participant check state 1106, which sends a message requesting a reply to either or both of the participants 102, 104. If the replies 1108 are deemed to be sufficient to indicate there is no security situation, the security state may be reset to OK 1110. Otherwise, if there is no reply 1112 or a reply indicating that there is a security problem 1114, then a security alarm state 1116 is moved to. The early participant separation state 1102 may also inquire 1120 using a passive participation check 1122, which further analyzes the security situation. Security Okay state 1110 indicates that a security situation does not exist 1124. Security alarm state 1116 indicates a security problem 1126.

Figure 12:
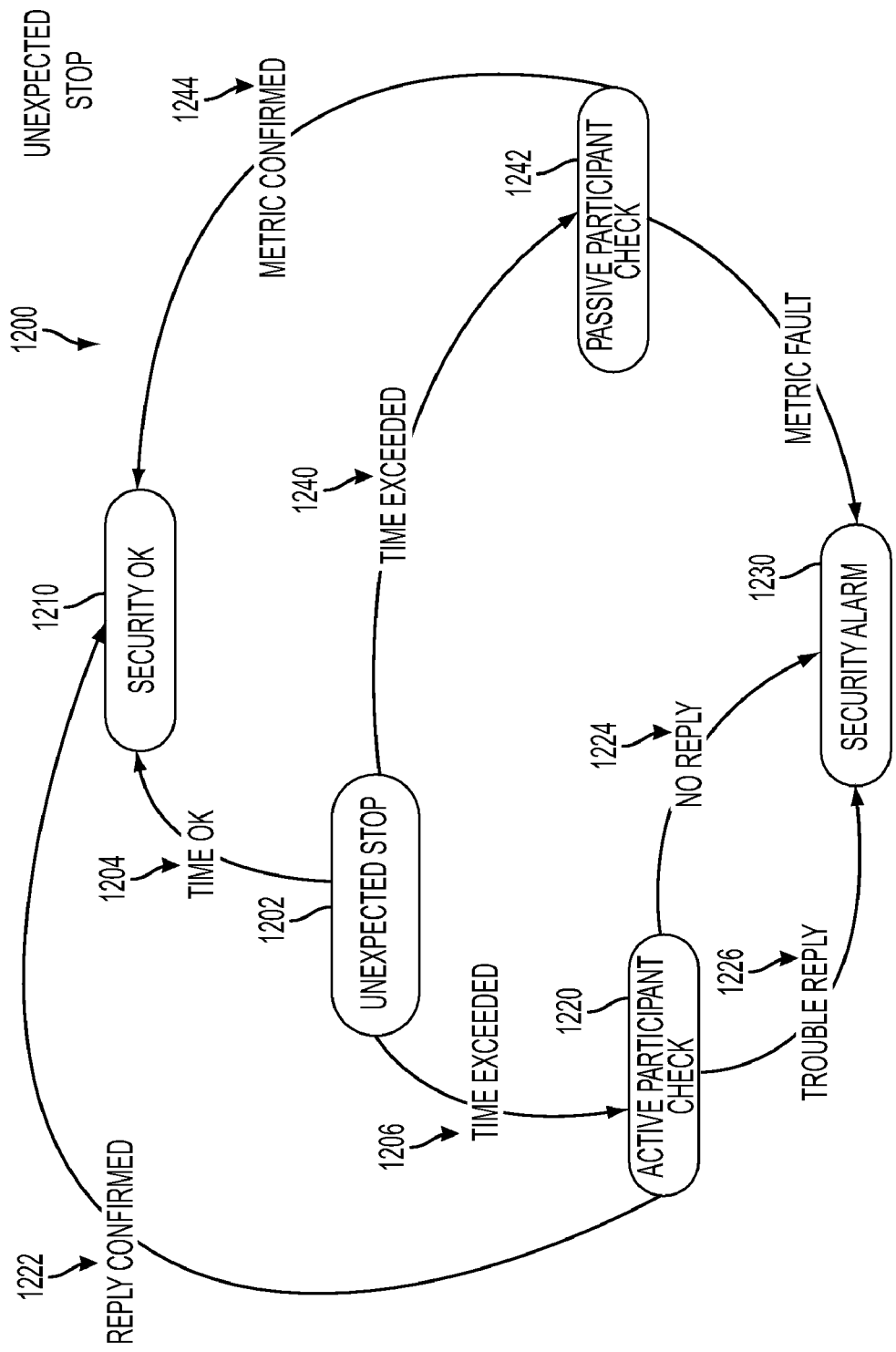
FIG. 12 is a state diagram illustrating an exemplary unexpected stop security monitor.

FIG. 12 illustrates an exemplary monitor 1200 that tracks the participant devices 112, 114 in near real-time and responds if the location information derived from those devices indicates that there has been an early and unexplained stop of either or both participant devices 112, 114 or the navigation system 115. If an unexpected stop state 1202 notes an anomaly, it may wait a pre-defined amount of time for the participants 102, 104 and the vehicle 110 to begin moving again, and to reset 1204 to security OK 1210 if the time limit is not exceeded. If the time limit is exceeded 1206, the state is moved to an active participant check state 1220, which sends a message requesting a reply to either or both of the participants 102, 104. If the replies are confirmed 1222 and deemed sufficient to indicate there is no security situation, the security state may be reset to OK 1210. Otherwise, if there is no reply 1224 or a reply indicates that there is a security problem 1226, and then a security alarm state 1230 is moved to. The unexpected stop state 1202 may also inquire 1240 using a passive participation check 1242, which for further analyzes the security situation and moves 1244 to a security okay state 1210 if it is satisfied that a security situation does not exist.

The methods and systems of the present invention can encompass embodiments in hardware, firmware, software, or a combination thereof. Hardware includes commercially available or proprietary computer systems having a processor for executing program instructions and memory for storing those instructions.

While the invention has been particularly shown and described as referenced to the embodiments thereof, those skilled in the art will understand that the foregoing and other changes in form and detail may be made therein without departing from the spirit and scope of this disclosure. Further, presently unforeseen or unanticipated alternatives, modifications, variations, or obvious improvements therein may be subsequently made by those skilled in the art, which are also intended to be encompassed by the following claims.

What is claimed is:

1. A method for providing participant security in a rideshare environment, comprising:

having available a rideshare participant device including communications capabilities and location determining capabilities to at least one rideshare participant during a rideshare;

monitoring the rideshare participant device while the rideshare is in progress for abnormalities indicating a security alert; and taking a security action in response to the security alert, comprising:

communicating a security inquiry message to the rideshare participant device;

requesting a rideshare participant reply from the rideshare participant;

contacting a security response provider if the rideshare participant replies that there is a security problem or if the rideshare participant did not respond within a predefined response time threshold; and canceling the security alert if the passenger replies that there is no security problems.

2. The method of claim 1, further comprising:

assigning a trip route;

determining the location of the rideshare participant device; and generating a security alert when the location of the rideshare participant device deviates from the trip route by more than a predefined threshold.

3. The method of claim 2, further comprising assigning the trip route based at least in part upon security considerations.

4. The method of claim 3, wherein the security considerations include selecting a trip route for which the communication connectivity to the rideshare participant device is expected to be maintained throughout the trip.

5. The method of claim 3, wherein the security considerations include selecting the trip route such that the trip route meets a criterion for exposure to the public.

6. The method of claim 1, further comprising:

requiring that the rideshare participant reply to the security inquiry message by including an identity confirmation token;

confirming the validity of the identity confirmation token;

contacting a security response provider if the validity of the identity confirmation token is not confirmed; and canceling the security alert if the validity of the identity confirmation token is confirmed.

7. The method of claim 6, wherein the identity confirmation token is a personal identification number entered by the rideshare participant in response to the security inquiry message.

8. The method of claim 6, further comprising:

providing a biometric input device with the rideshare participant device; and generating the identity confirmation token from biometric information associated with the rideshare participant.

9. A method for providing participant security in a rideshare environment, comprising:

having available rideshare participant devices each including communications capabilities and location determining capabilities to at least one rideshare participant during a rideshare, wherein the rideshare participant devices comprise at least one driver rideshare participant device and at least one passenger rideshare participant device;

monitoring the rideshare participant devices while the rideshare is in progress for abnormalities indicating a security alert; and taking a security action in response to the security alert, comprising:

determining the location of the driver rideshare participant device and the passenger rideshare participant device; and generating a security alert when the location of the driver rideshare participant device and the location of the passenger rideshare participant device deviate from each other by more than a predefined threshold.

10. A system for providing participant security in a rideshare environment, comprising:

a rideshare participant device including communications capabilities and location determining capabilities and provided to at least one rideshare participant during a rideshare;

a rideshare transaction monitor module to monitor the rideshare participant device while the rideshare is in progress for abnormalities indicating a security alert; and a rideshare security module to take a security action in response to the security alert comprising communicating a security inquiry message to the rideshare participant device, requesting a rideshare participant reply from the rideshare participant, contacting a security response provider if the rideshare participant replies that there is a security problem or if the rideshare participant did not respond within a predefined response time threshold, and canceling the security alert if the passenger replies that there is no security problems.

11. The system of claim 10, further comprising:

a navigation module to assign a trip route and to determine the location of the rideshare participant device; and the rideshare security module to generate a security alert when the location of the rideshare participant device deviates from the trip route by more than a predefined threshold.

12. The system of claim 11, wherein the navigation module assigns the trip route based at least in part upon security considerations.

13. The system of claim 12, wherein the security considerations include selecting the trip route for which the communication connectivity to the rideshare participant device is expected to be maintained throughout the trip.

14. The system of claim 12, wherein the security considerations include selecting the trip route such that the trip route meets a criterion for exposure to the public.

15. The system of claim 10, wherein the rideshare security module requires the rideshare participant to reply to the security inquiry message by including an identity confirmation token, confirms the validity of the identity confirmation token, contacts a security response provider if the validity of the identity confirmation token is not confirmed, and cancels the security alert if the validity of the identity confirmation token is confirmed.

16. The method of claim 15, wherein the identity confirmation token is a personal identification number entered by the rideshare participant in response to the security inquiry message.

17. The method of claim 15, further comprising:

a biometric input device provided with the rideshare participant device to generate the identity confirmation token from biometric information associated with the rideshare participant.

18. A system for providing participant security in a rideshare environment, comprising:

rideshare participant devices each including communications capabilities and location determining capabilities and provided to at least one rideshare participant during a rideshare, wherein the rideshare participant devices comprise at least one driver rideshare participant device and at least one passenger device;

a rideshare transaction monitor module to monitor the rideshare participant device while the rideshare is in progress for abnormalities indicating a security alert; and a rideshare security module to take a security action in response to the security alert comprising determining the location of the driver rideshare participant device and the passenger rideshare participant device and generating a security alert when the location of the driver rideshare participant device and the location of the passenger rideshare participant device deviate from each other by more than a predefined threshold.

* * * * *